US010040074B2

(12) United States Patent
Damann

(10) Patent No.: US 10,040,074 B2
(45) Date of Patent: Aug. 7, 2018

(54) MICROFLOTATION SYSTEM HAVING AN EXPANSION VALVE ASSEMBLY AND METHOD FOR OPERATING A MICROFLOTATION SYSTEM

(71) Applicant: Roland Damann, Paderborn (DE)

(72) Inventor: Roland Damann, Paderborn (DE)

( * ) Notice: Subject to any disclaimer, the term of this patent is extended or adjusted under 35 U.S.C. 154(b) by 0 days.

(21) Appl. No.: 15/543,048

(22) PCT Filed: Oct. 20, 2015

(86) PCT No.: PCT/EP2015/074221
§ 371 (c)(1),
(2) Date: Jul. 12, 2017

(87) PCT Pub. No.: WO2016/113007
PCT Pub. Date: Jul. 21, 2016

(65) Prior Publication Data
US 2018/0001328 A1    Jan. 4, 2018

(30) Foreign Application Priority Data
Jan. 13, 2015   (EP) .................................... 15150884

(51) Int. Cl.
*C02F 1/24* (2006.01)
*B03D 1/14* (2006.01)
(Continued)

(52) U.S. Cl.
CPC ....... *B03D 1/1431* (2013.01); *B01D 17/0205* (2013.01); *B01D 19/0063* (2013.01);
(Continued)

(58) Field of Classification Search
None
See application file for complete search history.

(56) References Cited

U.S. PATENT DOCUMENTS

| 3,542,675 | A | * | 11/1970 | Kennett | ................... | B03D 1/24 |
|  |  |  |  |  |  | 137/98 |
| 3,870,635 | A | * | 3/1975 | Clarke-Pounder | ... | B03D 1/1431 |
|  |  |  |  |  |  | 209/168 |
| 5,693,222 | A |  | 12/1997 | Galvan et al. |  |  |

FOREIGN PATENT DOCUMENTS

| DE | 102011005031 A1 | 9/2012 |
| DE | 102011077104 A1 | 12/2012 |
| WO | 2008147050 A1 | 12/2008 |

OTHER PUBLICATIONS

Kim Sung-Joon et al.; "Microbubble-inducing Charateristics Depending on Various Nozzle and Pressure in Dissolved Air Flotation Process"; KSCE Journal of Civil Engineering, Korean Society of Civil Engineers; vol. 19, No. 3, Sep. 15, 2014; pp. 558-563; XP035454114; ISSN: 11226-7988.

(Continued)

*Primary Examiner* — Thomas M Lithgow
(74) *Attorney, Agent, or Firm* — Barclay Damon LLP

(57) ABSTRACT

A microflotation system comprises a flotation tank with a dispersion water feed line in which an expansion valve arrangement is disposed. An adjusting apparatus is configured to adjust a flow rate of the expansion valve arrangement and an electronic control is connected to the adjusting apparatus. A measuring apparatus is disposed downstream from the expansion valve arrangement for detecting a size distribution of gas bubbles and the electronic control is configured to set the flow rate depending on a size distribution detected with the measuring apparatus.

15 Claims, 11 Drawing Sheets

(51) Int. Cl.
    *B03D 1/02*     (2006.01)
    *B03D 1/24*     (2006.01)
    *B01D 17/02*     (2006.01)
    *B01D 19/00*     (2006.01)
    *B01D 21/00*     (2006.01)
    *B01D 35/157*     (2006.01)
    *B03D 1/008*     (2006.01)

(52) U.S. Cl.
    CPC ........... *B03D 1/028* (2013.01); *B03D 1/1443* (2013.01); *B03D 1/245* (2013.01); *B01D 21/0024* (2013.01); *B01D 35/1573* (2013.01); *B03D 1/008* (2013.01); *C02F 1/24* (2013.01)

(56) References Cited

OTHER PUBLICATIONS

R.B. Moruzzi et al.; "Characterization of micro-bubble size distribution and flow configuration in DAF contact zone by a non-intrusive image analysis system and tracer tests"; Water & Science Technology; vol. 61, No. 1; Jan. 1, 2010; pp. 253-262; XP055104462; ISSN: 0273-1223.

Hudson J.B. Couto, et al.; "Micro-bubble size distribution measurements by laser diffraction technique"; Minerals Engineering; Pergamon Press; Oxford GB; Bd. 22, No. 4; Mar. 1, 2009; pp. 330-335; XP025951579; ISSN: 0892-6875.

R.T. Rodrigues et al.; "New basis for measuring the size distribution of bubbles"; Minerals Engineering; Pergamon Press; Oxford GB; vol. 16, No. 8; Aug. 1, 2003; pp. 757-765; XP027537572; ISSN: 0892-6875.

T. Takahashi et al; "Fundamental Study of Bubble Formation in Dissolved Air Pressure Flotation"; Journal of Chemical Engineering of Japan; vol. 12, No. 4; Jan. 1, 1979; pp. 275-280; XP055200078; ISSN: 0021-9592.

Fu-tai Chen et al; "Bubble performance of a novel dissolved air flotation (DAF) unit"; Journal of Environmental Sciences; Elsevier BV, NL; vol. 16, No. 1; Jan. 1, 2004; pp. 104-107; XP009128561; ISSN: 1001-0742.

PCT/EP2015/074221; Filing Date Oct. 20, 2015; International Search Report; dated Jul. 21, 2016; 10 pages.

PCT/EP2015/074221; Filing Date Oct. 20, 2015; International Preliminary Report on Patentability; dated Jul. 27, 2017; 8 pages.

* cited by examiner

MICROFLOTATION SYSTEM HAVING AN EXPANSION VALVE ASSEMBLY AND METHOD FOR OPERATING A MICROFLOTATION SYSTEM

CROSS REFERENCE TO RELATED APPLICATION

This application is a national stage application pursuant to 35 U.S.C. § 371 of International Application No. PCT/EP2015/074221, filed Oct. 20, 2015, which claims priority to European Patent Application No. 15 150 884.3, filed Jan. 13, 2015. The entire contents of both documents are hereby incorporated by reference.

BACKGROUND OF THE INVENTION

The invention relates to a microflotation system with a flotation tank in which dispersion water enriched with a gas is introduced through a dispersion water feed line in which an expansion valve is arranged. In the expansion of the dispersion water, microbubbles form which slowly rise in the flotation tank and collect on impurities and transport them to the surface of the flotation tank. Such microflotation systems are suitable for purifying a wide range of wastewaters and are distinguished in principle by largely service-free and economical operation.

With most known microflotation systems, the amount of dispersion water supplied to the flotation tank can be adjusted by a one-time setting of an expansion valve. According to a guide value, approximately 10 L of dispersion water per kilogram solid content in the waste water must be supplied for satisfactory purification.

From U.S. Pat. No. 5,693,222, it is known to measure cloudiness of the wastewater purified in a microflotation system and, in the event of strong cloudiness, to actuate an expansion valve so that more gas is supplied. An optimum gas/solid ratio is thereby pursued.

Against this background, it is the object of the invention to provide a microflotation system that produces an optimum purification effect under changing operating conditions while working very efficiently, as well as a corresponding method for operating a microflotation system.

BRIEF SUMMARY OF THE INVENTION

The microflotation system has a flotation tank that has a dispersion water feed line in which an expansion valve arrangement is arranged, an adjusting apparatus by means of which a flow rate of the expansion valve arrangement can be adjusted, and an electronic control that is connected to the adjusting apparatus. A measuring apparatus is arranged downstream from the expansion valve arrangement for detecting a size distribution of gas bubbles, and the electronic control is connected to the measuring apparatus and is designed to set the flow rate depending on a size distribution detected with the measuring apparatus.

When the microflotation system is operating, dispersion water is supplied to the flotation tank through the dispersion water feed line. This is water that is under elevated pressure in which gas is dissolved, ideally at a saturation concentration. The gas can, in particular, be air. Along the path to the flotation tank, the dispersion water flows through the expansion valve arrangement, wherein the pressure drops basically to the ambient pressure which causes the desired formation of microbubbles.

The flow rate of the dispersion water through the dispersion water feed line can be set using the adjusting apparatus. This setting greatly influences the size range of the gas bubbles arising during relaxation. For many applications, it is advantageous when the majority of gas bubbles has a diameter ranging from about 20 μm to about 50 μm. However, the arising size range depends in fact on a plurality of fluctuating parameters that are difficult to discern. This includes inter alia the pH, salt content, grease/oil content, chemical oxygen demand, cloudiness, the redox potential, oxygen content, and solids content of the water used to produce the dispersion water. Since this water is frequently taken from an effluent drain of the flotation tank, the aforementioned properties of water can be strongly influenced inter alia by the composition of the wastewater to be treated. The aforementioned parameters can directly or indirectly influence the size distribution of the gas bubbles, for example by a more-or-less pronounced impairment or promotion of the solubility of the gas in the water.

In the invention, a measuring apparatus is arranged downstream from the expansion valve arrangement by means of which a gas distribution of the gas bubbles is detected. An electronic control sets the flow rate depending on the detected size distribution. In this manner, an undesirable change in the size distribution can be counteracted which, for example, can arise due to an altered composition of the wastewater to be purified. This allows the microflotation system to always be operated with a gas bubble size distribution that yields an optimum purification effect and greatest possible efficiency.

The gas bubble size distribution means a relative frequency of different gas bubble sizes. In addition, the absolute frequency of the gas bubbles of different sizes and/or the overall volume of the gas bubbles can also be detected. In this case, the overall amount of introduced gas can be detected and adapted if necessary in order to achieve an optimum purification effect and efficiency.

In one embodiment, the electronic control is designed to reduce the flow rate when the size distribution exceeds a predetermined level. Different statistical indexes of the detected size distribution are suitable as the predetermined level, such as a bubble size average, a median of the size distribution, or a statistical measure of the range size distribution. This embodiment is based on the insight that excessively large bubbles arise in particular when oversaturation has occurred in the preparation of the dispersion water. This effect can be counteracted by reducing the flow rate because the pressure upstream from the expansion valve arrangement rises, in particular in a reactor tank used for preparing the dispersion water, and the water can therefore absorb more gas. Consequently, oversaturation of the dispersion water is avoided, and the size distribution of the arising gas bubbles shifts towards smaller gas bubbles.

In one embodiment, the electronic control is designed to regulate the size distribution to a predetermined target level by controlling the flow rate. For example, a target value can be dictated for the average bubble size, or for a median of the bubble size, or for any other statistical index of the size distribution. Based on the detected size distribution, the actual value of this level is determined and compared with the target level. Deviations are counteracted by correspondingly controlling the flow rate. In this manner, the microflotation system can always be operated with a gas bubble size distribution identified as being optimum, which also increases the purification effect and efficiency.

In one embodiment, the measuring apparatus has a particle counter. Particle counters are known from other industrial applications and can be used to detect the size distribution of particles, i.e., solids, in liquids or gases. It is likewise possible to detect the size distribution of very fine liquid droplets in the dispersions. The inventor has found that such particle counters can also be used to detect the size distribution of gas bubbles in liquids. By using a particle counter, it is possible to economically and reliably detect the gas bubble size distribution as desired.

In one embodiment, the measuring apparatus is designed to detect the size distribution by means of laser diffraction. The supplied dispersion water with the gas bubbles is illuminated with laser light, and a diffraction pattern is detected. The size distribution can be determined by mathematically evaluating the diffraction pattern. A commercially-available measuring apparatus that functions according to this principle is the process particle size measuring apparatus "Insitec Wet" by the British supplier Malvern Instruments Ltd.

In one embodiment, the measuring apparatus is arranged between the expansion valve arrangement and a dispersion water feed for the flotation tank. This makes it possible to characterize the gas bubbles with particular clarity since mixing with the wastewater to be purified within the flotation tank is avoided. An arrangement of the measuring apparatus within the flotation tank is, however, also conceivable in principle.

In one embodiment, the dispersion water feed line has a branch line through which a partial flow of the dispersion water is conducted, and the measuring apparatus is arranged in the branch line. This makes it possible to specifically adapt in particular the flow rate and flow cross-section of the dispersion water used for measuring to the optimum measuring range of the measuring apparatus, and the detection of the size distribution can be simplified. The branch line branches off from the dispersion water feed line downstream from the expansion valve arrangement. The branch line can terminate directly in the flotation tank downstream from the measuring apparatus arranged in the branch line. Alternatively, downstream from the measuring apparatus, the branch line can rejoin a line section of the dispersion water feed line arranged downstream from a branching point so that the main flow and partial flow can be introduced together through a dispersion water feed into the flotation tank. In this case, the branch line forms a bypass.

In one embodiment, the microflotation system has a reactor tank which has a water feed and is designed to enrich water supplied by the water feed with gas under an elevated pressure, and to provide the dispersion water formed this manner to a dispersion water drain connected to the dispersion water feed line. The preparation of the dispersion water is thereby included in the microflotation system.

In one embodiment, the expansion valve arrangement has an expansion valve with an adjustable degree of opening, and the adjusting apparatus has an actuator by means of which the degree of opening can be adjusted. The actuator can for example be a stepping motor. The expansion valve can for example be a conical valve. In this manner, the flow rate can be precisely and reliably set using simple means.

The disclosed method serves for operating a microflotation system and comprises supplying dispersion water through an expansion valve arrangement into a flotation tank and detecting a size distribution of gas bubbles downstream from the expansion valve arrangement using a measuring apparatus. The method further comprises automatically controlling a flow rate of the expansion valve arrangement depending on the detected size distribution.

The method can in particular be used for operating a microflotation system having the features of one of claims 1 to 9.

In explaining the features and advantages of the method, reference will be made to the above explanations of the microflotation system which correspondingly apply. In particular, each of the features explained in conjunction with the microflotation system can be combined with the method.

Automatically controlling the flow rate of the expansion valve arrangement means that the flow rate can optionally be influenced over a long period without manual intervention, in particular by the electronic control already explained above.

In one embodiment, the flow rate is reduced when the size distribution exceeds a predetermined level. Reference is made in this regard to the explanations above of the corresponding characteristics of the microflotation system.

In one embodiment, the size distribution is regulated by controlling the flow rate to a predetermined target level. Reference is made in this regard to the explanations above of the corresponding characteristics of the microflotation system.

In one embodiment, the supplied dispersion water is divided into a partial flow and a main flow, and the size distribution is detected in the partial flow. Reference is made in this regard to the above explanations associated with the branch line which correspondingly apply.

In one embodiment, a laser diffraction pattern is evaluated to detect the size distribution. In this case as well, reference is made to the above explanations of laser diffraction.

BRIEF DESCRIPTION OF THE DRAWINGS

The invention is explained in greater detail below based on an exemplary embodiment shown in figures.

DETAILED DESCRIPTION OF THE INVENTION

Figure 1:
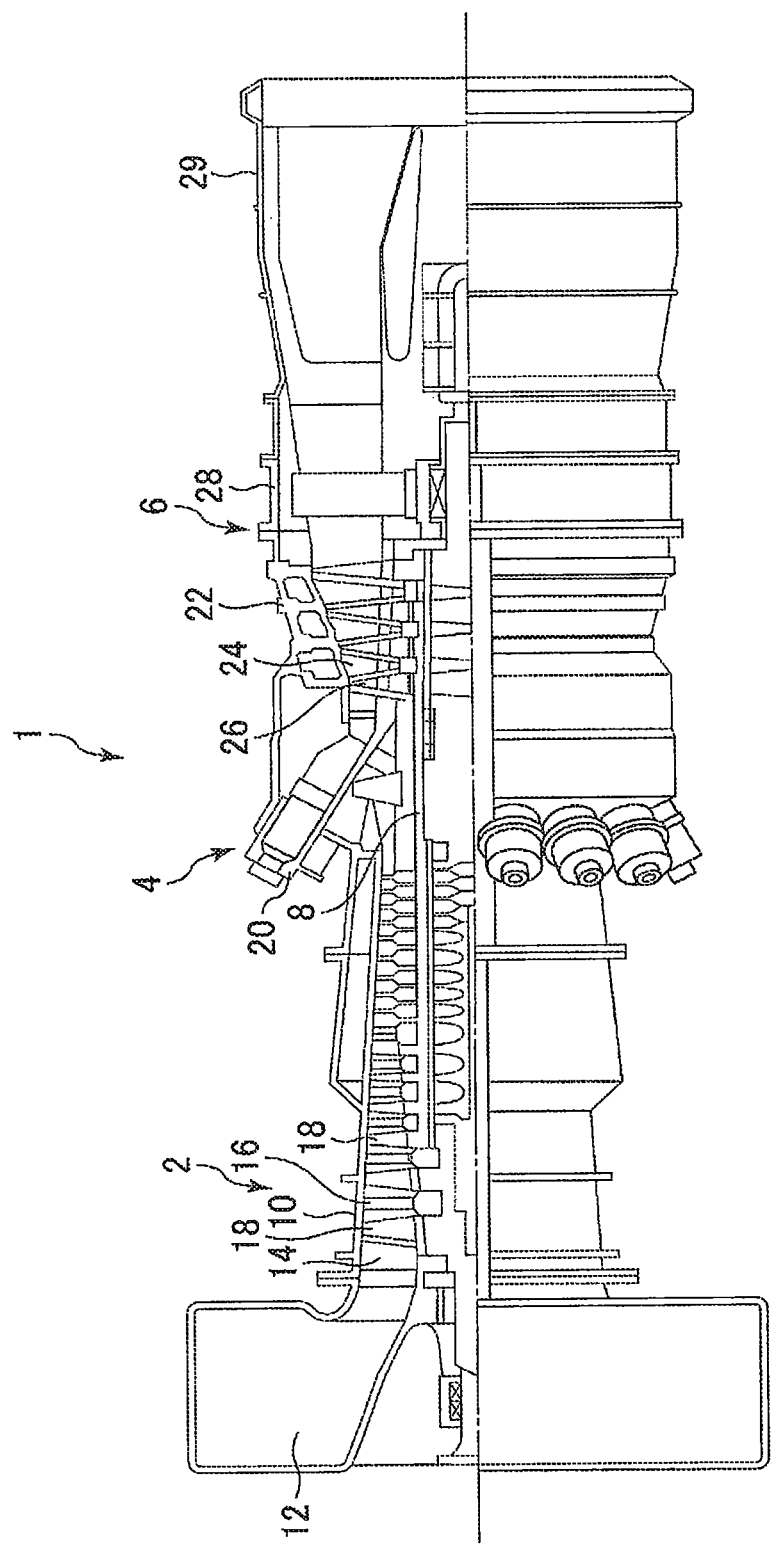
FIG. 1 shows a schematic representation of a microflotation system according to the invention.

The microflotation system 10 in FIG. 1 has a reactor tank 12 that is supplied with water through a water feed 14. In addition, a gas, in particular air, is supplied through a gas line 16 to the reactor tank 12. In the reactor tank 12 which is under an elevated pressure, for example within a range of 1.5 bar to 4 bar, the gas is mixed with water so that the gas dissolves in the water. A gas cushion 42 is above the indicated water level. The water which is saturated with the gas in an ideal case is designated dispersion water and can be removed from the reactor tank 12 through the dispersion water drain 18.

The water feed 14 is connected by a line to an effluent drain 20 of a flotation tank 22 of the microflotation system. A pump 24 is arranged in the line. The flotation tank 22 moreover has a dispersion water feed 26 that is connected by a dispersion water feed line 44, in which an expansion valve arrangement 28 is arranged, to the dispersion water drain 18 of the reactor tank 12. The dispersion water is supplied to the flotation tank 22 in this manner.

When a flow flows through the expansion valve arrangement 28, a relaxation of pressure occurs, and microbubbles consequently form which rise slowly in the flotation tank 22, collect on impurities, and bear them to the surface. There, the flotate which forms in this manner is drawn off by a clearing apparatus 40.

The dirty water to be purified is supplied to the flotation tank 22 through a dirty water feed 36. The purified wastewater can be removed from the flotation tank 22 through the other effluent drain 34 for further use.

In the invention, a measuring apparatus 32 is arranged downstream from the expansion valve arrangement 28 for detecting a size distribution of the generated gas bubbles. The measuring apparatus 32 has a particle counter (not shown) which detects the size distribution of the gas bubbles by means of laser diffraction.

The measuring apparatus 32 is arranged in a branch line 30 which branches off from the dispersion water feed line 44 downstream from the expansion valve arrangement 28. Downstream from the measuring apparatus 32, the branch line 30 rejoins the dispersion water feed line 44 which conducts a main flow of the dispersion water between the two connecting points to the branch line. A partial flow and main flow of the dispersion water are introduced into the flotation tank 22 through the dispersion water feed 26.

The measuring apparatus 32 is connected to an electronic control 38. The expansion valve arrangement 28 has an adjusting apparatus 46 which is also connected to the electronic control 38. The two aforementioned connections are indicated by dashed lines.

The electronic control 38 is designed to set the flow rate of the expansion valve arrangement 28 depending on a size distribution of the gas bubbles detected by the measuring apparatus 32.

Figure 2:
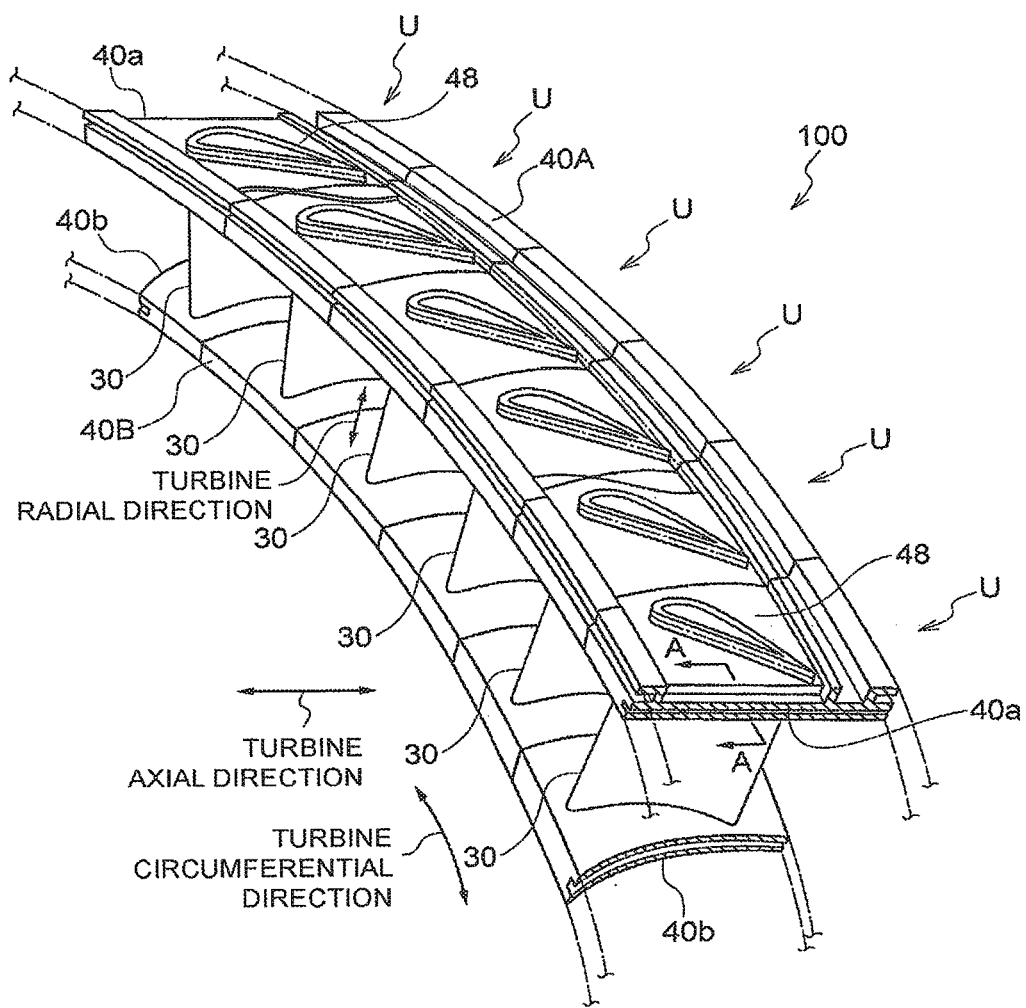
FIG. 2 shows a diagram of a detected size distribution of the generated gas bubbles.
Figure 3:
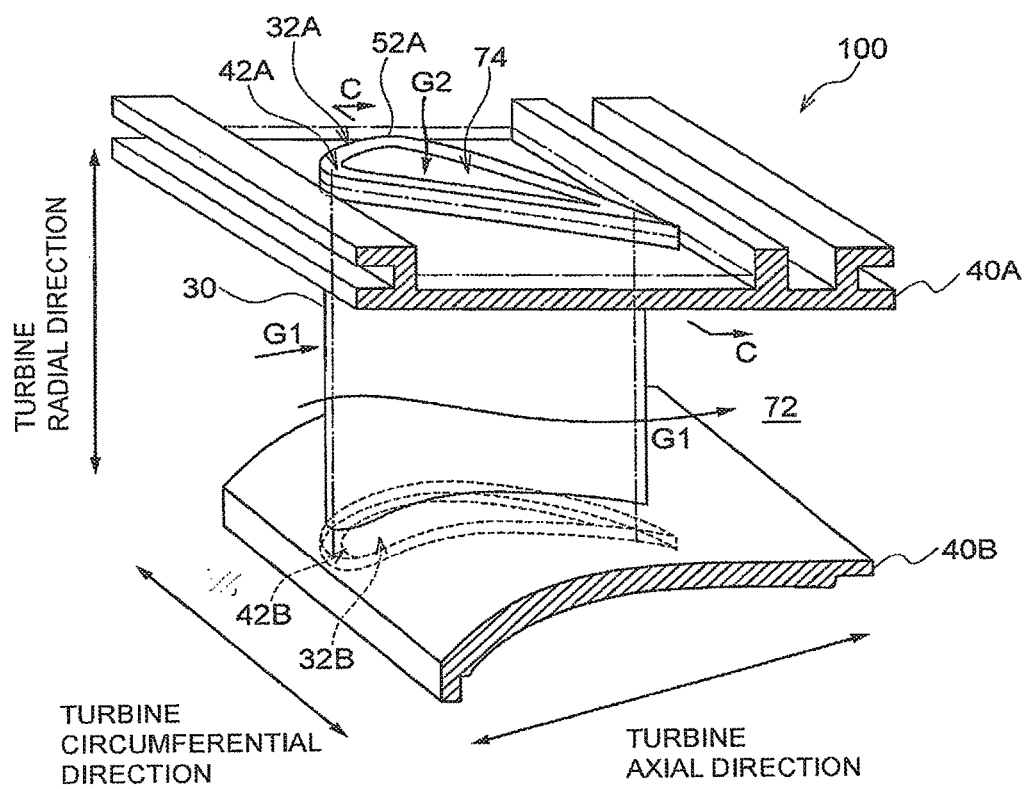
Figure 4:
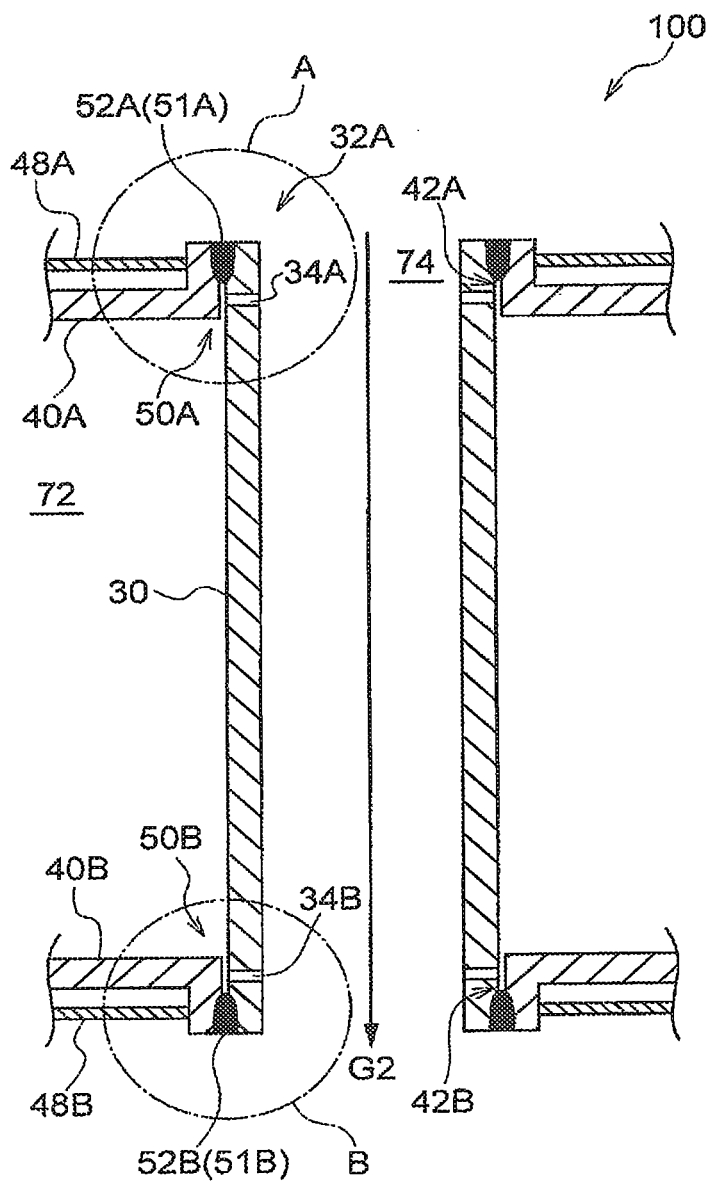
Figure 5:
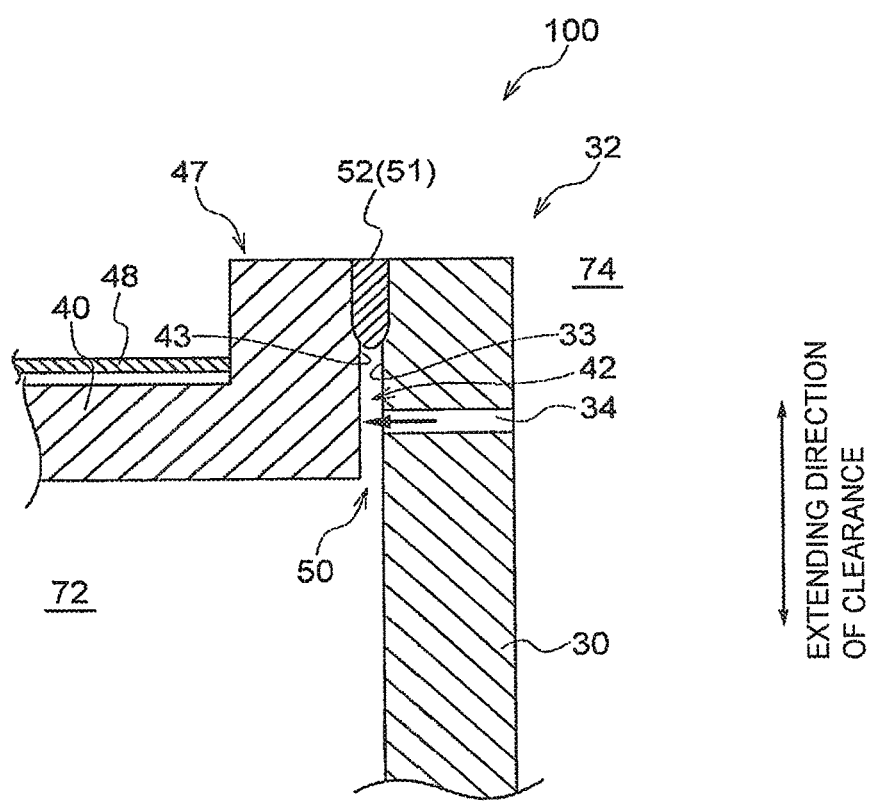
Figure 6:
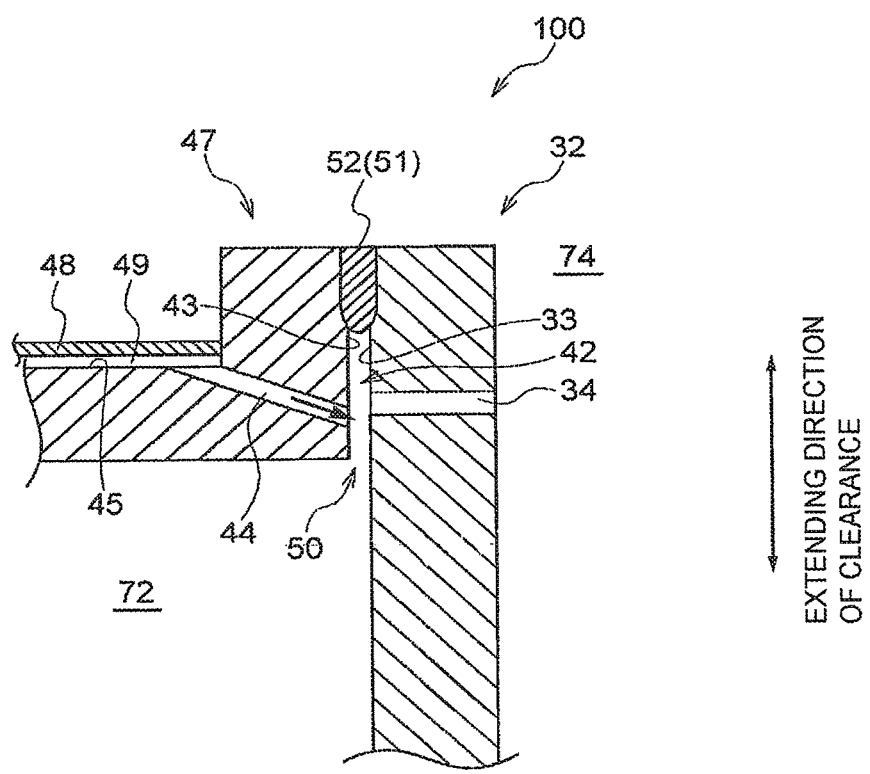
Figure 7:
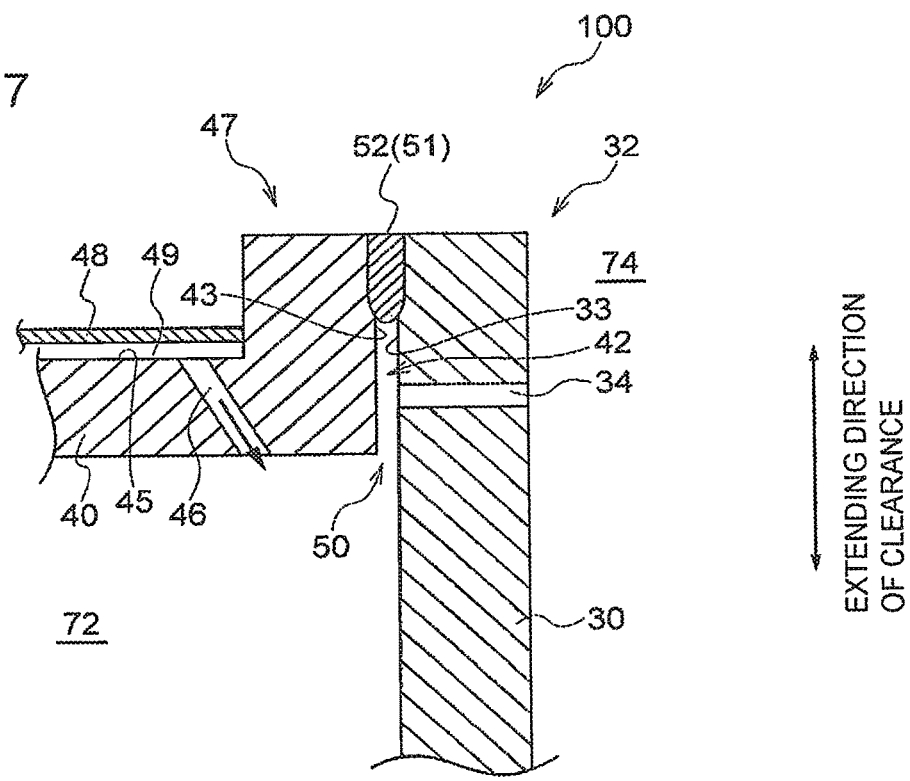
Figure 8:
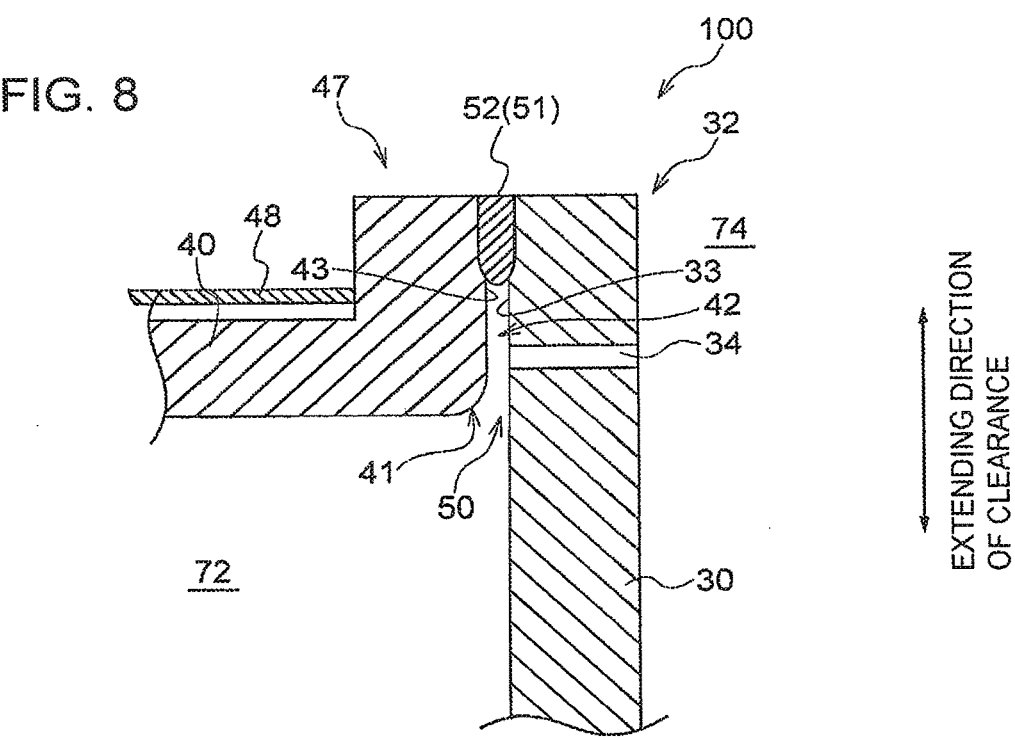
Figure 9:
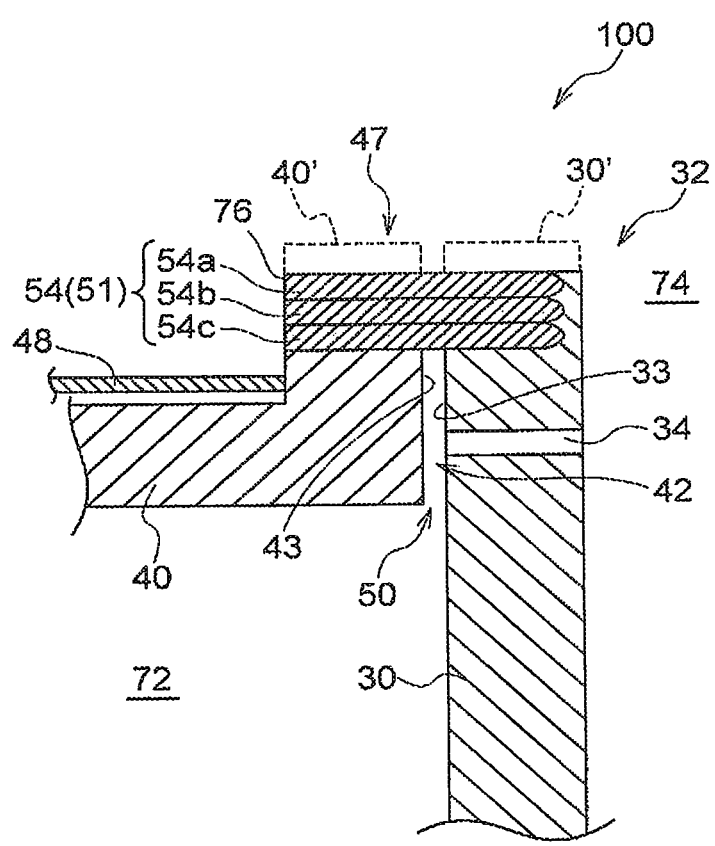
Figure 10:
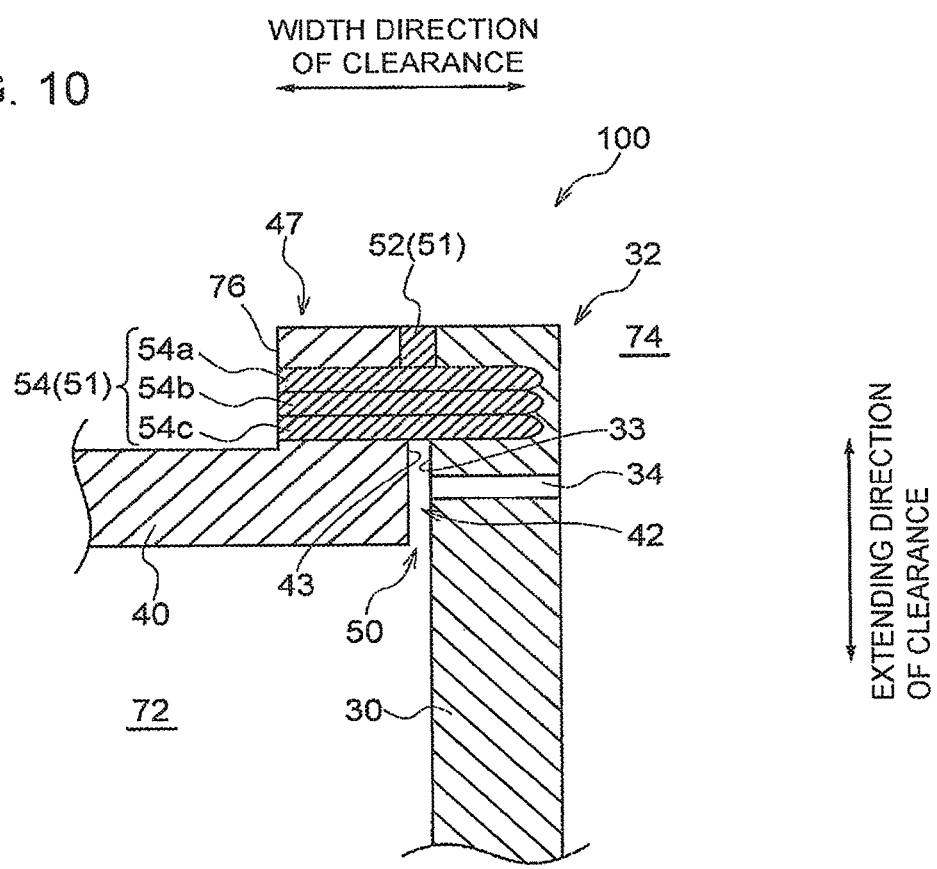
Figure 11:
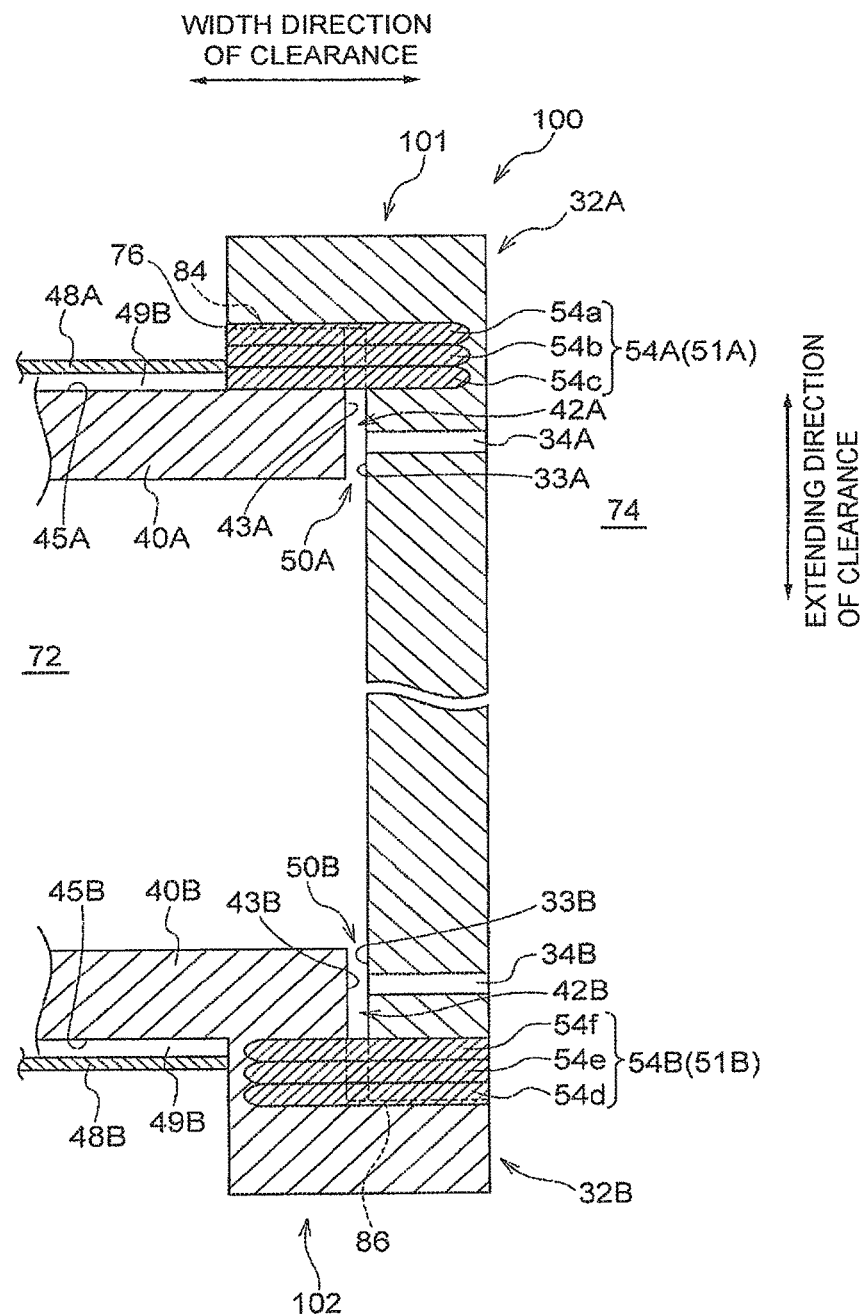
Figure 1:
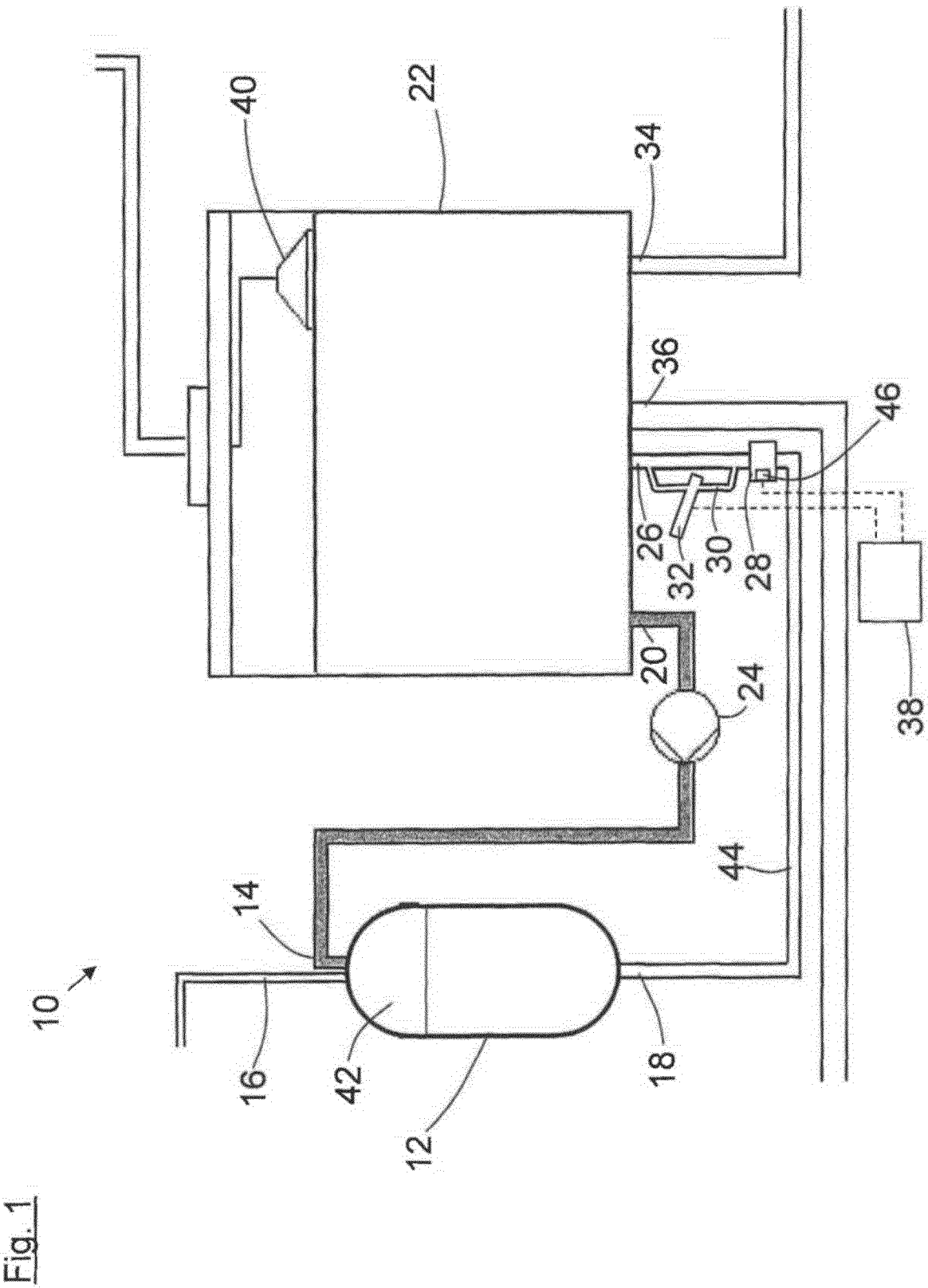
Figure 2:
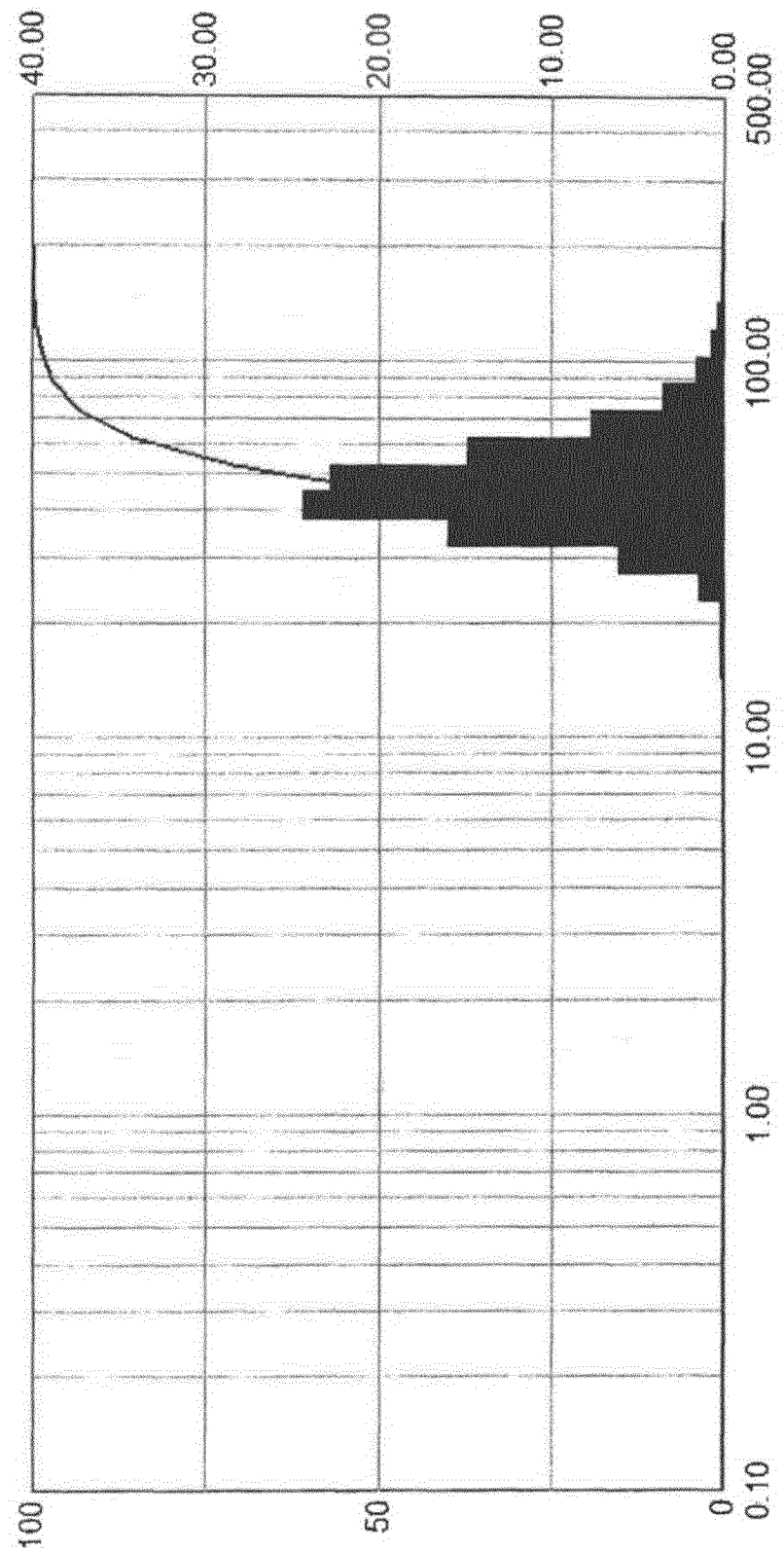

FIG. 2 shows an example of a diagram of a size distribution of the generated gas bubbles detected by the measuring apparatus 32. The diameter of the gas bubbles in micrometers is plotted on the horizontal axis. The left, vertical axis refers to the curve drawn in a continuous line in the diagram and indicates the cumulative volume of the gas bubbles in percent. For example, the curve reveals that the gas bubbles with a diameter of 50 μm or less comprise about 50% of the overall gas volume.

The vertical axis plotted on the right refers to the bars drawn in the diagram, and describes the volume frequency of the gas bubbles in percent. The longest bar shown in the diagram shows that the gas bubbles within the diameter range that is on the x-axis and is assigned to this bar have a volume-related frequency of about 24%.

The diagram shows that an informative characterization of the size distribution of the gas bubbles is possible with the assistance of the measuring apparatus; in the depicted example, a conventional particle counter was used.

LIST OF REFERENCE NUMBERS

10 Microflotation system
12 Reactor tank
14 Water feed
16 Gas line
18 Dispersion water drain
20 Effluent drain
22 Flotation tank
24 Pump
26 Dispersion water feed
28 Expansion valve arrangement
30 Branch line
32 Measuring apparatus
34 Dirty water feed
36 Effluent drain
38 Electronic control
40 Clearing apparatus
42 Gas cushion
44 Dispersion water feed line
46 Adjusting apparatus

The invention claimed is:

1. A microflotation system comprises:
   a flotation tank with a dispersion water feed line;
   an expansion valve arrangement disposed on the dispersion water feed line;
   an adjusting apparatus configured to adjust a flow rate of the expansion valve arrangement;
   an electronic control that is configured to connect to the adjusting apparatus; and
   a measuring apparatus disposed downstream from the expansion valve arrangement and configured to detect a size distribution of gas bubbles;
   wherein the electronic control is connected to the measuring apparatus and is configured to set the flow rate depending on the size distribution of gas bubbles detected with the measuring apparatus.

2. The microflotation system according to claim 1, wherein the electronic control is configured to reduce the flow rate when the size distribution of gas bubbles exceeds a predetermined level.

3. The microflotation system according to claim 1, wherein the electronic control is configured to regulate the size distribution of gas bubbles to a predetermined target level by controlling the flow rate.

4. The microflotation system according to claim 1, wherein the measuring apparatus has a particle counter.

5. The microflotation system according to claim 1, wherein the measuring apparatus is configured to detect the size distribution of gas bubbles by means of laser diffraction.

6. The microflotation system according to claim 1, wherein the measuring apparatus is disposed between the expansion valve arrangement and the dispersion water feed line of the flotation tank.

7. The microflotation system according to claim 1, wherein the dispersion water feed line has a branch line through which a partial flow of dispersion water is guided.

8. The microflotation system according to claim 1, further comprising a reactor tank with a water feed, the reactor tank being configured to enrich water supplied by the water feed with gas under an elevated pressure, and wherein the reactor tank is further configured to provide dispersion water to a dispersion water drain connected to the dispersion water feed line.

9. The microflotation system according to claim 1, wherein the expansion valve arrangement further comprises an expansion valve with an adjustable opening, and the adjusting apparatus further comprises an actuator configured to adjust the adjustable opening.

10. A method for operating a microflotation system comprising:
    supplying dispersion water through an expansion valve arrangement into a flotation tank;
    detecting a size distribution of gas bubbles downstream from the expansion valve arrangement using a measuring apparatus; and
    automatically controlling a flow rate of the expansion valve arrangement depending on the detected size distribution of gas bubbles.

11. The method according to claim 10, wherein the flow rate is reduced when the size distribution of gas bubbles exceeds a predetermined level.

12. The method according to claim 10, wherein the size distribution of gas bubbles is regulated by controlling the flow rate to a predetermined target level.

13. The method according to claim 10, wherein the supplied dispersion water is divided into a partial flow and a main flow, and wherein the size distribution of gas bubbles is detected in the partial flow.

14. The method according to claim 10, further comprising evaluating a laser diffraction pattern to detect the size distribution of gas bubbles.

15. The microflotation system according to claim 7, wherein the measuring apparatus is disposed in the branch line.

* * * * *

UNITED STATES PATENT AND TRADEMARK OFFICE
CERTIFICATE OF CORRECTION

| | |
|---|---|
| PATENT NO. | : 10,040,074 B2 |
| APPLICATION NO. | : 15/543048 |
| DATED | : August 7, 2018 |
| INVENTOR(S) | : Damann |

It is certified that error appears in the above-identified patent and that said Letters Patent is hereby corrected as shown below:

Please delete Patent No. 10,040,074 B2 in its entirety and replace it with Patent No. 10,040,074 B2 in its entirety as shown on the attached pages.

Signed and Sealed this
Fifth Day of May, 2020

Andrei Iancu
*Director of the United States Patent and Trademark Office*

(12) United States Patent
Damann

(10) Patent No.: US 10,040,074 B2
(45) Date of Patent: Aug. 7, 2018

(54) MICROFLOTATION SYSTEM HAVING AN EXPANSION VALVE ASSEMBLY AND METHOD FOR OPERATING A MICROFLOTATION SYSTEM

(71) Applicant: Roland Damann, Paderborn (DE)

(72) Inventor: Roland Damann, Paderborn (DE)

(*) Notice: Subject to any disclaimer, the term of this patent is extended or adjusted under 35 U.S.C. 154(b) by 0 days.

(21) Appl. No.: 15/543,048

(22) PCT Filed: Oct. 20, 2015

(86) PCT No.: PCT/EP2015/074221
§ 371 (c)(1),
(2) Date: Jul. 12, 2017

(87) PCT Pub. No.: WO2016/113007
PCT Pub. Date: Jul. 21, 2016

(65) Prior Publication Data
US 2018/0001328 A1  Jan. 4, 2018

(30) Foreign Application Priority Data

Jan. 13, 2015 (EP) .................... 15150884

(51) Int. Cl.
*C02F 1/24* (2006.01)
*B03D 1/14* (2006.01)
(Continued)

(52) U.S. Cl.
CPC ....... *B03D 1/1431* (2013.01); *B01D 17/0205* (2013.01); *B01D 19/0063* (2013.01);
(Continued)

(58) Field of Classification Search
None
See application file for complete search history.

(56) References Cited

U.S. PATENT DOCUMENTS 3,542,675 A * 11/1970 Kennett .............. B03D 1/24
137/98
3,870,635 A * 3/1975 Clarke-Pounder ... B03D 1/1431
209/168
5,693,222 A 12/1997 Galvan et al.

FOREIGN PATENT DOCUMENTS

DE 102011005031 A1 9/2012
DE 102011077104 A1 12/2012
WO 2008147050 A1 12/2008

OTHER PUBLICATIONS

Kim Sung-Joon et al.: "Microbubble-inducing Characteristics Depending on Various Nozzle and Pressure in Dissolved Air Flotation Process"; KSCE Journal of Civil Engineering, Korean Society of Civil Engineers; vol. 19, No. 3, Sep. 15, 2014; pp. 558-563; XP035454114; ISSN: 11226-7988.
(Continued)

*Primary Examiner* — Thomas M Lithgow
(74) *Attorney, Agent, or Firm* — Barclay Damon LLP

(57) ABSTRACT

A microflotation system comprises a flotation tank with a dispersion water feed line in which an expansion valve arrangement is disposed. An adjusting apparatus is configured to adjust a flow rate of the expansion valve arrangement and an electronic control is connected to the adjusting apparatus. A measuring apparatus is disposed downstream from the expansion valve arrangement for detecting a size distribution of gas bubbles and the electronic control is configured to set the flow rate depending on a size distribution detected with the measuring apparatus.

15 Claims, 2 Drawing Sheets

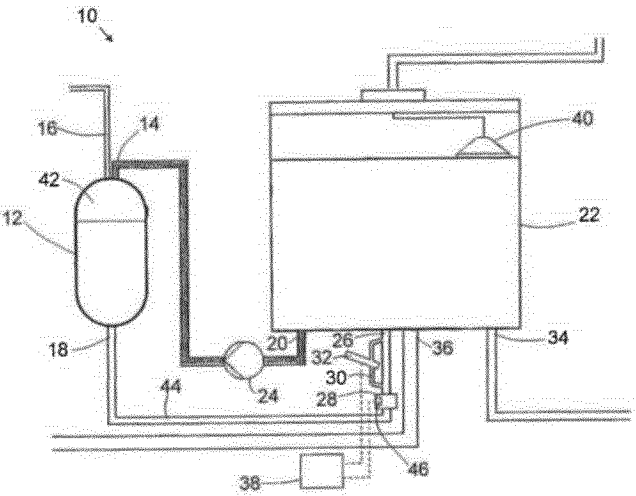

(51) Int. Cl.
　　　B03D 1/02　　(2006.01)
　　　B03D 1/24　　(2006.01)
　　　B01D 17/02　 (2006.01)
　　　B01D 19/00　 (2006.01)
　　　B01D 21/00　 (2006.01)
　　　B01D 35/157　(2006.01)
　　　B03D 1/008　 (2006.01)

(52) U.S. Cl.
　　　CPC .......... *B03D 1/028* (2013.01); *B03D 1/1443* (2013.01); *B03D 1/245* (2013.01); *B01D 21/0024* (2013.01); *B01D 35/1573* (2013.01); *B03D 1/008* (2013.01); *C02F 1/24* (2013.01)

(56) References Cited

OTHER PUBLICATIONS

R.B. Moruzzi et al.; "Characterization of micro-bubble size distribution and flow configuration in DAF contact zone by a non-intrusive image analysis system and tracer tests"; Water & Science Technology; vol. 61, No. 1; Jan. 1, 2010; pp. 253-262; XP055104462; ISSN: 0273-1223.

Hudson J.B. Couto, et al.; "Micro-bubble size distribution measurements by laser diffraction technique"; Minerals Engineering; Pergamon Press; Oxford GB; Bd. 22, No. 4; Mar. 1, 2009; pp. 330-335; XP025951579; ISSN: 0892-6875.

R.T. Rodrigues et al.; "New basis for measuring the size distribution of bubbles"; Minerals Engineering; Pergamon Press; Oxford GB; vol. 16, No. 8; Aug. 1, 2003; pp. 757-765; XP027537572; ISSN: 0892-6875.

T. Takahashi et al; "Fundamental Study of Bubble Formation in Dissolved Air Pressure Flotation"; Journal of Chemical Engineering of Japan; vol. 12, No. 4; Jan. 1, 1979; pp. 275-280; XP055200078; ISSN: 0021-9592.

Fu-tai Chen et al; "Bubble performance of a novel dissolved air flotation (DAF) unit"; Journal of Environmental Sciences; Elsevier BV, NL; vol. 16, No. 1; Jan. 1, 2004; pp. 104-107; XP009128561; ISSN: 1001-0742.

PCT/EP2015/074221; Filing Date Oct. 20, 2015; International Search Report; dated Jul. 21, 2016; 10 pages.

PCT/EP2015/074221; Filing Date Oct. 20, 2015; International Preliminary Report on Patentability; dated Jul. 27, 2017; 8 pages.

* cited by examiner

MICROFLOTATION SYSTEM HAVING AN EXPANSION VALVE ASSEMBLY AND METHOD FOR OPERATING A MICROFLOTATION SYSTEM

CROSS REFERENCE TO RELATED APPLICATION

This application is a national stage application pursuant to 35 U.S.C. § 371 of International Application No. PCT/EP2015/074221, filed Oct. 20, 2015, which claims priority to European Patent Application No. 15 150 884.3, filed Jan. 13, 2015. The entire contents of both documents are hereby incorporated by reference.

BACKGROUND OF THE INVENTION

The invention relates to a microflotation system with a flotation tank in which dispersion water enriched with a gas is introduced through a dispersion water feed line in which an expansion valve is arranged. In the expansion of the dispersion water, microbubbles form which slowly rise in the flotation tank and collect on impurities and transport them to the surface of the flotation tank. Such microflotation systems are suitable for purifying a wide range of wastewaters and are distinguished in principle by largely service-free and economical operation.

With most known microflotation systems, the amount of dispersion water supplied to the flotation tank can be adjusted by a one-time setting of an expansion valve. According to a guide value, approximately 10 L of dispersion water per kilogram solid content in the waste water must be supplied for satisfactory purification.

From U.S. Pat. No. 5,693,222, it is known to measure cloudiness of the wastewater purified in a microflotation system and, in the event of strong cloudiness, to actuate an expansion valve so that more gas is supplied. An optimum gas/solid ratio is thereby pursued.

Against this background, it is the object of the invention to provide a microflotation system that produces an optimum purification effect under changing operating conditions while working very efficiently, as well as a corresponding method for operating a microflotation system.

BRIEF SUMMARY OF THE INVENTION

The microflotation system has a flotation tank that has a dispersion water feed line in which an expansion valve arrangement is arranged, an adjusting apparatus by means of which a flow rate of the expansion valve arrangement can be adjusted, and an electronic control that is connected to the adjusting apparatus. A measuring apparatus is arranged downstream from the expansion valve arrangement for detecting a size distribution of gas bubbles, and the electronic control is connected to the measuring apparatus and is designed to set the flow rate depending on a size distribution detected with the measuring apparatus.

When the microflotation system is operating, dispersion water is supplied to the flotation tank through the dispersion water feed line. This is water that is under elevated pressure in which gas is dissolved, ideally at a saturation concentration. The gas can, in particular, be air. Along the path to the flotation tank, the dispersion water flows through the expansion valve arrangement, wherein the pressure drops basically to the ambient pressure which causes the desired formation of microbubbles.

The flow rate of the dispersion water through the dispersion water feed line can be set using the adjusting apparatus. This setting greatly influences the size range of the gas bubbles arising during relaxation. For many applications, it is advantageous when the majority of gas bubbles has a diameter ranging from about 20 µm to about 50 µm. However, the arising size range depends in fact on a plurality of fluctuating parameters that are difficult to discern. This includes inter alia the pH, salt content, grease/oil content, chemical oxygen demand, cloudiness, the redox potential, oxygen content, and solids content of the water used to produce the dispersion water. Since this water is frequently taken from an effluent drain of the flotation tank, the aforementioned properties of water can be strongly influenced inter alia by the composition of the wastewater to be treated. The aforementioned parameters can directly or indirectly influence the size distribution of the gas bubbles, for example by a more-or-less pronounced impairment or promotion of the solubility of the gas in the water.

In the invention, a measuring apparatus is arranged downstream from the expansion valve arrangement by means of which a gas distribution of the gas bubbles is detected. An electronic control sets the flow rate depending on the detected size distribution. In this manner, an undesirable change in the size distribution can be counteracted which, for example, can arise due to an altered composition of the wastewater to be purified. This allows the microflotation system to always be operated with a gas bubble size distribution that yields an optimum purification effect and greatest possible efficiency.

The gas bubble size distribution means a relative frequency of different gas bubble sizes. In addition, the absolute frequency of the gas bubbles of different sizes and/or the overall volume of the gas bubbles can also be detected. In this case, the overall amount of introduced gas can be detected and adapted if necessary in order to achieve an optimum purification effect and efficiency.

In one embodiment, the electronic control is designed to reduce the flow rate when the size distribution exceeds a predetermined level. Different statistical indexes of the detected size distribution are suitable as the predetermined level, such as a bubble size average, a median of the size distribution, or a statistical measure of the range size distribution. This embodiment is based on the insight that excessively large bubbles arise in particular when oversaturation has occurred in the preparation of the dispersion water. This effect can be counteracted by reducing the flow rate because the pressure upstream from the expansion valve arrangement rises, in particular in a reactor tank used for preparing the dispersion water, and the water can therefore absorb more gas. Consequently, oversaturation of the dispersion water is avoided, and the size distribution of the arising gas bubbles shifts towards smaller gas bubbles.

In one embodiment, the electronic control is designed to regulate the size distribution to a predetermined target level by controlling the flow rate. For example, a target value can be dictated for the average bubble size, or for a median of the bubble size, or for any other statistical index of the size distribution. Based on the detected size distribution, the actual value of this level is determined and compared with the target level. Deviations are counteracted by correspondingly controlling the flow rate. In this manner, the microflotation system can always be operated with a gas bubble size distribution identified as being optimum, which also increases the purification effect and efficiency.

In one embodiment, the measuring apparatus has a particle counter. Particle counters are known from other industrial applications and can be used to detect the size distribution of particles, i.e., solids, in liquids or gases. It is likewise possible to detect the size distribution of very fine liquid droplets in the dispersions. The inventor has found that such particle counters can also be used to detect the size distribution of gas bubbles in liquids. By using a particle counter, it is possible to economically and reliably detect the gas bubble size distribution as desired.

In one embodiment, the measuring apparatus is designed to detect the size distribution by means of laser diffraction. The supplied dispersion water with the gas bubbles is illuminated with laser light, and a diffraction pattern is detected. The size distribution can be determined by mathematically evaluating the diffraction pattern. A commercially-available measuring apparatus that functions according to this principle is the process particle size measuring apparatus "Insitec Wet" by the British supplier Malvern Instruments Ltd.

In one embodiment, the measuring apparatus is arranged between the expansion valve arrangement and a dispersion water feed for the flotation tank. This makes it possible to characterize the gas bubbles with particular clarity since mixing with the wastewater to be purified within the flotation tank is avoided. An arrangement of the measuring apparatus within the flotation tank is, however, also conceivable in principle.

In one embodiment, the dispersion water feed line has a branch line through which a partial flow of the dispersion water is conducted, and the measuring apparatus is arranged in the branch line. This makes it possible to specifically adapt in particular the flow rate and flow cross-section of the dispersion water used for measuring to the optimum measuring range of the measuring apparatus, and the detection of the size distribution can be simplified. The branch line branches off from the dispersion water feed line downstream from the expansion valve arrangement. The branch line can terminate directly in the flotation tank downstream from the measuring apparatus arranged in the branch line. Alternatively, downstream from the measuring apparatus, the branch line can rejoin a line section of the dispersion water feed line arranged downstream from a branching point so that the main flow and partial flow can be introduced together through a dispersion water feed into the flotation tank. In this case, the branch line forms a bypass.

In one embodiment, the microflotation system has a reactor tank which has a water feed and is designed to enrich water supplied by the water feed with gas under an elevated pressure, and to provide the dispersion water formed this manner to a dispersion water drain connected to the dispersion water feed line. The preparation of the dispersion water is thereby included in the microflotation system.

In one embodiment, the expansion valve arrangement has an expansion valve with an adjustable degree of opening, and the adjusting apparatus has an actuator by means of which the degree of opening can be adjusted. The actuator can for example be a stepping motor. The expansion valve can for example be a conical valve. In this manner, the flow rate can be precisely and reliably set using simple means.

The disclosed method serves for operating a microflotation system and comprises supplying dispersion water through an expansion valve arrangement into a flotation tank and detecting a size distribution of gas bubbles downstream from the expansion valve arrangement using a measuring apparatus. The method further comprises automatically controlling a flow rate of the expansion valve arrangement depending on the detected size distribution.

The method can in particular be used for operating a microflotation system having the features of one of claims 1 to 9.

In explaining the features and advantages of the method, reference will be made to the above explanations of the microflotation system which correspondingly apply. In particular, each of the features explained in conjunction with the microflotation system can be combined with the method.

Automatically controlling the flow rate of the expansion valve arrangement means that the flow rate can optionally be influenced over a long period without manual intervention, in particular by the electronic control already explained above.

In one embodiment, the flow rate is reduced when the size distribution exceeds a predetermined level. Reference is made in this regard to the explanations above of the corresponding characteristics of the microflotation system.

In one embodiment, the size distribution is regulated by controlling the flow rate to a predetermined target level. Reference is made in this regard to the explanations above of the corresponding characteristics of the microflotation system.

In one embodiment, the supplied dispersion water is divided into a partial flow and a main flow, and the size distribution is detected in the partial flow. Reference is made in this regard to the above explanations associated with the branch line which correspondingly apply.

In one embodiment, a laser diffraction pattern is evaluated to detect the size distribution. In this case as well, reference is made to the above explanations of laser diffraction.

BRIEF DESCRIPTION OF THE DRAWINGS

The invention is explained in greater detail below based on an exemplary embodiment shown in figures.

FIG. 1 shows a schematic representation of a microflotation system according to the invention.

FIG. 2 shows a diagram of a detected size distribution of the generated gas bubbles.

DETAILED DESCRIPTION OF THE INVENTION

The microflotation system 10 in FIG. 1 has a reactor tank 12 that is supplied with water through a water feed 14. In addition, a gas, in particular air, is supplied through a gas line 16 to the reactor tank 12. In the reactor tank 12 which is under an elevated pressure, for example within a range of 1.5 bar to 4 bar, the gas is mixed with water so that the gas dissolves in the water. A gas cushion 42 is above the indicated water level. The water which is saturated with the gas in an ideal case is designated dispersion water and can be removed from the reactor tank 12 through the dispersion water drain 18.

The water feed 14 is connected by a line to an effluent drain 20 of a flotation tank 22 of the microflotation system. A pump 24 is arranged in the line. The flotation tank 22 moreover has a dispersion water feed 26 that is connected by a dispersion water feed line 44, in which an expansion valve arrangement 28 is arranged, to the dispersion water drain 18 of the reactor tank 12. The dispersion water is supplied to the flotation tank 22 in this manner.

When a flow flows through the expansion valve arrangement 28, a relaxation of pressure occurs, and microbubbles consequently form which rise slowly in the flotation tank 22, collect on impurities, and bear them to the surface. There, the flotate which forms in this manner is drawn off by a clearing apparatus 40.

The dirty water to be purified is supplied to the flotation tank 22 through a dirty water feed 36. The purified wastewater can be removed from the flotation tank 22 through the other effluent drain 34 for further use.

In the invention, a measuring apparatus 32 is arranged downstream from the expansion valve arrangement 28 for detecting a size distribution of the generated gas bubbles. The measuring apparatus 32 has a particle counter (not shown) which detects the size distribution of the gas bubbles by means of laser diffraction.

The measuring apparatus 32 is arranged in a branch line 30 which branches off from the dispersion water feed line 44 downstream from the expansion valve arrangement 28. Downstream from the measuring apparatus 32, the branch line 30 rejoins the dispersion water feed line 44 which conducts a main flow of the dispersion water between the two connecting points to the branch line. A partial flow and main flow of the dispersion water are introduced into the flotation tank 22 through the dispersion water feed 26.

The measuring apparatus 32 is connected to an electronic control 38. The expansion valve arrangement 28 has an adjusting apparatus 46 which is also connected to the electronic control 38. The two aforementioned connections are indicated by dashed lines.

The electronic control 38 is designed to set the flow rate of the expansion valve arrangement 28 depending on a size distribution of the gas bubbles detected by the measuring apparatus 32.

FIG. 2 shows an example of a diagram of a size distribution of the generated gas bubbles detected by the measuring apparatus 32. The diameter of the gas bubbles in micrometers is plotted on the horizontal axis. The left, vertical axis refers to the curve drawn in a continuous line in the diagram and indicates the cumulative volume of the gas bubbles in percent. For example, the curve reveals that the gas bubbles with a diameter of 50 µm or less comprise about 50% of the overall gas volume.

The vertical axis plotted on the right refers to the bars drawn in the diagram, and describes the volume frequency of the gas bubbles in percent. The longest bar shown in the diagram shows that the gas bubbles within the diameter range that is on the x-axis and is assigned to this bar have a volume-related frequency of about 24%.

The diagram shows that an informative characterization of the size distribution of the gas bubbles is possible with the assistance of the measuring apparatus; in the depicted example, a conventional particle counter was used.

LIST OF REFERENCE NUMBERS

10 Microflotation system
12 Reactor tank
14 Water feed
16 Gas line
18 Dispersion water drain
20 Effluent drain
22 Flotation tank
24 Pump
26 Dispersion water feed
28 Expansion valve arrangement
30 Branch line
32 Measuring apparatus
34 Dirty water feed
36 Effluent drain
38 Electronic control
40 Clearing apparatus
42 Gas cushion
44 Dispersion water feed line
46 Adjusting apparatus

The invention claimed is:

1. A microflotation system comprises:
   a flotation tank with a dispersion water feed line;
   an expansion valve arrangement disposed on the dispersion water feed line;
   an adjusting apparatus configured to adjust a flow rate of the expansion valve arrangement;
   an electronic control that is configured to connect to the adjusting apparatus; and
   a measuring apparatus disposed downstream from the expansion valve arrangement and configured to detect a size distribution of gas bubbles;
   wherein the electronic control is connected to the measuring apparatus and is configured to set the flow rate depending on the size distribution of gas bubbles detected with the measuring apparatus.

2. The microflotation system according to claim 1, wherein the electronic control is configured to reduce the flow rate when the size distribution of gas bubbles exceeds a predetermined level.

3. The microflotation system according to claim 1, wherein the electronic control is configured to regulate the size distribution of gas bubbles to a predetermined target level by controlling the flow rate.

4. The microflotation system according to claim 1, wherein the measuring apparatus has a particle counter.

5. The microflotation system according to claim 1, wherein the measuring apparatus is configured to detect the size distribution of gas bubbles by means of laser diffraction.

6. The microflotation system according to claim 1, wherein the measuring apparatus is disposed between the expansion valve arrangement and the dispersion water feed line of the flotation tank.

7. The microflotation system according to claim 1, wherein the dispersion water feed line has a branch line through which a partial flow of dispersion water is guided.

8. The microflotation system according to claim 1, further comprising a reactor tank with a water feed, the reactor tank being configured to enrich water supplied by the water feed with gas under an elevated pressure, and wherein the reactor tank is further configured to provide dispersion water to a dispersion water drain connected to the dispersion water feed line.

9. The microflotation system according to claim 1, wherein the expansion valve arrangement further comprises an expansion valve with an adjustable opening, and the adjusting apparatus further comprises an actuator configured to adjust the adjustable opening.

10. A method for operating a microflotation system comprising:
    supplying dispersion water through an expansion valve arrangement into a flotation tank;
    detecting a size distribution of gas bubbles downstream from the expansion valve arrangement using a measuring apparatus; and
    automatically controlling a flow rate of the expansion valve arrangement depending on the detected size distribution of gas bubbles.

11. The method according to claim 10, wherein the flow rate is reduced when the size distribution of gas bubbles exceeds a predetermined level.

12. The method according to claim 10, wherein the size distribution of gas bubbles is regulated by controlling the flow rate to a predetermined target level.

13. The method according to claim 10, wherein the supplied dispersion water is divided into a partial flow and a main flow, and wherein the size distribution of gas bubbles is detected in the partial flow.

14. The method according to claim 10, further comprising evaluating a laser diffraction pattern to detect the size distribution of gas bubbles.

15. The microflotation system according to claim 7, wherein the measuring apparatus is disposed in the branch line.

* * * * *